Patented Dec. 31, 1929

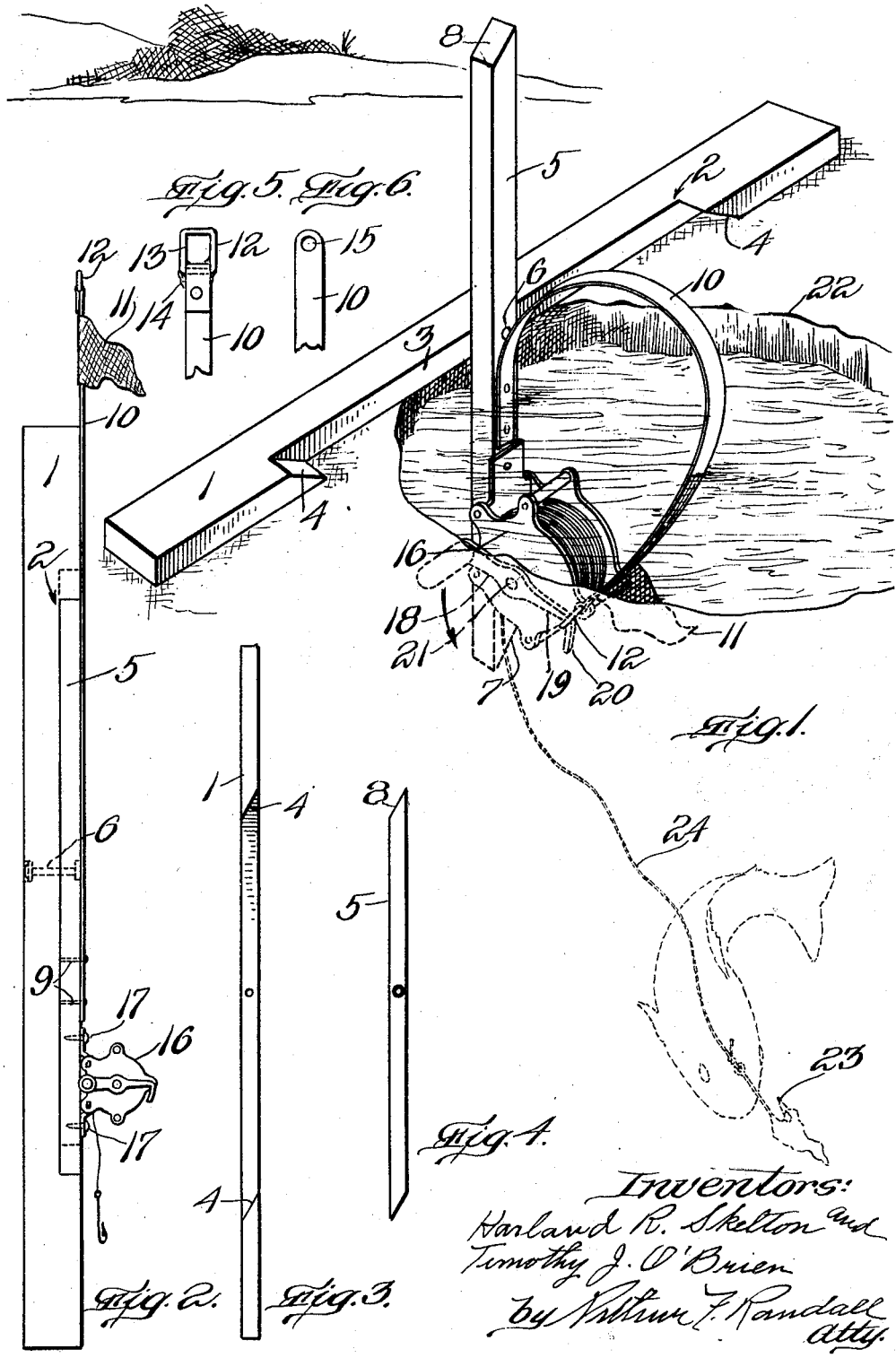

1,741,253

UNITED STATES PATENT OFFICE

HARLAND R. SKELTON, OF NANTASKET, AND TIMOTHY J. O'BRIEN, OF HULL, MASSACHUSETTS

FISHING TACKLE

Application filed February 20, 1928. Serial No. 255,534.

Our invention relates to fishing tackle and particularly to fishing tackle for use in fishing through ice, the object of our invention being to provide an improved apparatus of this class.

Almost invariably fishing operations through the ice are carried on in freezing cold weather by reason of which the ice is produced and one objection to that class of apparatus or tackle, heretofore provided which included a signal device, has been that the wet line above the water would freeze, rendering the outfit inoperative, particularly when a reel was employed.

Our invention provides a fishing tackle or apparatus so constructed and organized that the portion of the line that cooperates with and actuates the signal operating mechanism, is under water and, therefore, protected against freezing by rendering the apparatus inoperative. In the best form of our invention a reel is provided that is constructed with a latch by means of which a spring arm is normally held in a lowered flexed position, said latch being operated through movement of the reel imparted thereto by the pull of the fish to free said spring signal arm and permit the latter to rise into an elevated position as a signal that a catch has been made. In the best form of our invention the apparatus includes a base bar or member to rest upon the ice along side or across the hole through which the fishing is to be done and this base member carries and supports a post that extends down into the water within the hole in the ice. Preferably the reel and latch are mounted upon the lower portion of this post so as to be submerged in the water when the apparatus is in use, thereby preventing freezing of the line. Other features of our invention are hereinafter pointed out.

In the accompanying drawings—

Figure 1 is a perspective view showing one form of our new fishing tackle or apparatus in use and set for a catch.

Figure 2 is a side elevation of our improved apparatus showing the same in its collapsed condition.

Figure 3 is an edge view of the base member hereinafter referred to.

Figure 4 is an edge view of the post member hereinafter referred to.

Figure 5 is a detail, on larger scale, of the free end portion of the spring signal arm of the apparatus shown in Figs. 1 and 2.

Figure 6 illustrates a modification.

Our improved fishing tackle or apparatus comprises a base member 1 which may consist of a bar of wood which may be about one inch and a half wide and two feet long, said bar being formed at one side thereof with an elongated notch 2 that is outlined or bordered by a straight flat side wall 3 and two oblique and parallel end walls 4, 4.

Within this notch 2 is provided a post member 5 pivotally connected at its middle by a rivet 6 to the base member 1 at the middle of the wall 3 against which said post member 5 is fitted, as shown in Fig. 2. The opposite ends of the post member 5 are obliquely disposed with relation to the axis of the latter so that when said post member is swung on the pivotal rivet 6 into a position where it lies wholly within the notch 2 the beveled ends 7 and 8 of the post member 5 fit against the end walls 4 of the notch 2 and by engagement therewith maintain the post member 5 in alinement with the base member 1. The notch 2 may conveniently be made about one half of an inch deep and, preferably, the width of the post member 5 is the same as the depth of the notch 2 so that when the post member and base member are disposed parallel, side by side, as in Fig. 2, the post member does not extend outside of the notch 2.

The post member 5 has fastened to it, as by nails 9, one end of a spring metal strip or arm 10 provided at its free end with a signal flag 11 and an eye 12. As shown in Figs. 2 and 5 the eye 12 may be constituted by a bent piece of wire extending through a loop 13 provided at the extremity of the spring arm 10 and to which said eye may be rigidly fixed as by solder 14. Or the bent piece of wire 12 and the loop 13 may be dispensed with by providing the end portion of the spring arm 10 with a hole or aperture 15 as shown in Fig. 6.

At one side of the pivotal connection 6 the post 5 has fastened to it, as by screws 17, a reel 16 which is of ordinary construction except that its crank arm 18 is made with a latch hook 19 made with a laterally projecting extension or nose 20 which faces rearwardly, that is, in a direction opposite to that in which the reel is rotated when the line is pulled off from the reel by a fish. It will thus be clear that the arbor 21 of the reel 16 carries a rearwardly pointed latch hook 19 which, as a matter of convenience, may be constituted by an extension of the crank arm 18 as herein shown but which, obviously, may be otherwise provided on the arbor 21 or on the reel in such a manner as to be operated with and by the latter. This latch hook 19 is adapted to be engaged with the eye 12 or the hole 15 of the spring metal signal arm 10, as shown in Fig. 1, and when this spring arm 10 is bent down into the position shown in Fig. 1 the pressure of its extremity against the latch hook 19 is in a direction radially outward from the axis of the arbor 21 of the reel so that said latch hook effectually holds the spring arm 10 in its bent position.

When the apparatus is in use the base member 1 is laid upon the ice across or close to a hole such as 22 with the post 5 held in a vertical position by the weight of the reel 16 at the lower end thereof. When a fish takes the hook 23 and pulls upon the line 24 the reel is rotated in the direction of the arrow, Fig. 1, thereby moving the latch hook 19—20 forward out of the eye 12 of the spring arm 10 whereupon the latter snaps into an upright position against the post 5 displaying its flag 11 above the latter.

An important feature of the construction above described is that the reel is mounted upon the lower end portion of a post that is supported in a perpendicular position by the base member 1 when the apparatus is in use, so that reel 16 and all of the line 24, including the part that is wound upon the reel, is submerged in the water in the hole 22 and thereby protected against freezing, and rendering the apparatus inoperative or making it necessary for the user to thaw out or clean the same.

When the line 24 is wound up on to the reel 16 and the post 5 is swung into position within the notch 2 the parts are, as shown in Fig. 2, closely grouped together into a small compact bundle that is convenient to transport or store away.

A point to be noted in the above described construction is that the center of gravity of the post 5 is offset with respect to the pivot 6 so that the weight at that side of the pivot operates to hold the post in its vertical position when the apparatus is in use. Another point is that by forming the base member 1 with a notch 2 and pivotally mounting the post 5 within that notch provides shoulders 4, 4 on the base member which serve to position the post in the same plane with the latter but, of course, these positioning shoulders or abutments may be otherwise provided.

What we claim is:

1. A fishing tackle comprising a base member adapted to rest upon the ice adjacent a hole formed therethrough; a reel; a fishing line on said reel; a rigid arm connected with said base member and extending downward therefrom into said hole for supporting said reel in a position where it is submerged in the water, a signal mechanism carried by said arm and operated by the pull of a fish on said line.

2. A fishing tackle comprising a base member adapted to rest upon the ice adjacent a hole formed therethrough; a reel; means connected with said base member and extending downward therefrom into said hole for supporting said reel in a position where it is submerged in the water; a fishing line on said reel, and signal mechanism operated by rotation of the reel occasioned by the unwinding of the line from the latter when a fish pulls on said line.

3. A fishing tackle comprising a base member adapted to rest upon the ice adjacent a hole formed therethrough; a post member pivotally connected with said base member so as to occupy either a position parallel with and alongside of said base member or an operative vertical position perpendicular to said base member and a reel mounted upon said post member near a free end thereof that is submerged in the water within said hole when said post member occupies its operative position.

4. A fishing tackle constructed in accordance with claim 3 wherein said reel is made with an arbor, and including also a latch arm on and movable with said arbor; a flexible spring signal arm fixed at one end to said post and adapted to be bent downward and engaged at its opposite end with said latch arm whereby it is held bent downward by said latch but is freed from the latter and caused to spring upward into an upright position when said reel is operated by a fish.

5. A fishing tackle comprising a base member adapted to rest upon the ice adjacent a hole formed therethrough, said base member being provided at one side thereof with a longitudinal notch; a post member mounted within said notch and pivotally connected with said base member to rotate on an axis at right angles to the bottom wall of said notch; means on said base member engaging said post member to limit its rotary movement in one direction and position said member in parallelism with said base member; a reel mounted on said post member adjacent a free end thereof, said reel including an arbor and a latch arm on said arbor, and a flexible spring signal arm mounted on said post in position to co-operate with said latch.

Signed by us at Boston, county of Suffolk and State of Massachusetts this 8th day of February, 1928.

HARLAND R. SKELTON.
TIMOTHY J. O'BRIEN.